United States Patent [19]

Mehta

[11] Patent Number: 4,881,686

[45] Date of Patent: Nov. 21, 1989

[54] TEMPERATURE RECOVERY DISPLAY DEVICE FOR AN ELECTRONIC PROGRAMMABLE THERMOSTAT

[75] Inventor: Vinay Mehta, Germantown, Tenn.

[73] Assignee: Hunter-Melnor, Inc., Memphis, Tenn.

[21] Appl. No.: 256,987

[22] Filed: Oct. 13, 1988

[51] Int. Cl.$^4$ .................................................. F23N 5/20
[52] U.S. Cl. ........................................ 236/46 R; 236/94
[58] Field of Search .............. 236/46 R, 94; 165/11.1, 165/29

[56] References Cited

U.S. PATENT DOCUMENTS

| | | | |
|---|---|---|---|
| 4,071,745 | 1/1978 | Hall | 165/22 R |
| 4,200,910 | 4/1980 | Hall | 236/46 R |
| 4,217,646 | 8/1980 | Caltagirone et al. | 165/22 X |
| 4,266,599 | 5/1981 | Saunders et al. | 165/12 X |
| 4,335,847 | 6/1982 | Levine | 236/46 R |
| 4,373,351 | 2/1983 | Stamp, Jr. et al. | 236/46 R |
| 4,386,649 | 6/1983 | Hines et al. | 236/46 R |
| 4,442,972 | 4/1984 | Sahay et al. | 236/46 R |
| 4,446,913 | 5/1984 | Krocker | 165/12 |
| 4,606,401 | 8/1986 | Levine et al. | 165/12 |
| 4,621,336 | 11/1986 | Brown | 364/557 |
| 4,771,392 | 9/1988 | Hall | 364/557 |

FOREIGN PATENT DOCUMENTS 1164071 3/1984 Canada ............................. 236/46 R Primary Examiner—William E. Wayner
Attorney, Agent, or Firm—Heiskell, Donelson, Bearman, Adams, Williams & Kirsch

[57] ABSTRACT

A programmable thermostat for an air conditioning system for a predetermined volume of space is provided which includes a digital memory for storing a plurality of program times and program temperatures corresponding to the program times, a sensor for sensing the ambient temperature within the predetermined volume of space, a timer for generating the current time of day, and a controller for controlling the on/off switching of the air conditioning system in response to (1) a comparison of the current time of day with the program times stored in the digital memory to access the corresponding current control temperature stored in the digital memory and (2) comparison of the current ambient temperature sensed by the sensor with the current control temperature stored in the memory. A temperature recovery system activates and controls the air conditioning system prior to a given program time so as to bring the ambient temperature of the predetermined volume of space to the control temperature corresponding to the given program time by the given program time. The programmable thermostat includes one or more display devices which provide a visual indication when the temperature recovery program has activated and is controlling the air conditioning system. The display device may also include a graphic display for visually indicating the extent to which recovery has been effected.

15 Claims, 7 Drawing Sheets

TEMPERATURE RECOVERY DISPLAY DEVICE FOR AN ELECTRONIC PROGRAMMABLE THERMOSTAT

BACKGROUND OF THE INVENTION

The present invention generally relates to programmable thermostats and, more particularly, to a thermostat display for an electronic programmable thermostat having a temperature recovery system.

Attempts to develop improved heating and cooling systems generally focus on improved efficiency coupled with reduced cost. One technique which attempts to embody these concepts is temperature setback and recovery. Generally, setback refers to the concept of lowering the setpoint temperature of a thermostat during night time periods or periods when the region controlled by the thermostat is unoccupied in order to reduce the energy required to heat the controlled region. A related concept called set-up refers to the raising of the setpoint temperature of a thermostat during periods of nonoccupancy of the controlled region in order to reduce the energy required to cool the region. Finally, recovery refers to the concept of activating a heating or cooling system so as to raise (or lower) the temperature at the end of setback (or setup) to some predetermined temperature.

Studies conducted by the Department of Energy estimate that setting a thermostat back 10° F. for two eight-hour periods during winter can reduce a user's energy costs by as much as 35%. Setting a thermostat up 5° for two eight-hour periods during summer can reduce a user's energy costs by up to 25%. For example, a thermostat may be programmed to raise the ambient room temperature from a setback temperature of 60° F. to a programmed temperature of 68° F. by 6 a.m. In a thermostat which has a built-in recovery system, the heating system will begin operating at sometime prior to 6 a.m. so that by 6 a.m., the ambient temperature will be 68° F.

However, when temperature recovery begins and the heating system is activated, a user may wonder why the heating system is not operating in accordance with the current program temperatures. This may cause a user to believe that his thermostat and heating system are malfunctioning. A similar situation can result when the cooling system attempts to lower the ambient temperature by initiating recovery prior to the subsequent program time.

SUMMARY OF THE INVENTION

Accordingly, it is an object of the present invention to provide a thermostat which informs a user that a temperature recovery operation is active.

It is another object of the present invention to provide a thermostat which informs a user of the extent to which temperature recovery has been effected.

In accordance with the present invention, a programmable thermostat for an air conditioning system for a predetermined volume of space is provided which includes a digital memory for storing a plurality of program times and program temperatures corresponding to the program times, a controller for controlling the on-/off switching of the air conditioning system in response to a comparison of the ambient temperature of the predetermined volume of space and the program temperatures, and a temperature recovery mechanism for activating the air conditioning system prior to a given program time so as to bring the ambient temperature of the predetermined volume of space to the corresponding program temperature by the program time. The programmable thermostat further includes a display which provides a visual indication that the temperature recovery mechanism has activated the air conditioning system.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

DETAILED DESCRIPTION OF THE PREFERRED EMBODIMENT

Table 1 illustrates a possible daily temperature program of a programmable thermostat in accordance with the present invention.

TABLE 1

| PROGRAM # | TIME | TEMPERATURE |
|---|---|---|
| 1 | 6:00 A.M. | 68° F. |
| 2 | 8:00 A.M. | 60° |
| 3 | 4:00 P.M. | 68° |
| 4 | 11:00 P.M. | 60° |

It should be noted that although Table 1 and the discussion herebelow discuss the present invention in terms of a heating system, the invention is readily applicable to cooling systems. As used herein, the phrase "air conditioning system" will generally refer to both heating and cooling systems.

At 11:00 p.m., the thermostat enters a setback mode during which the ambient temperature of the region or volume of space controlled by the thermostat is maintained at 60°. By 6:00 a.m., the temperature of the controlled region should be raised to 68°. In order to achieve this result, the heating system will begin a temperature recovery operation at some time prior to 6:00 a.m. Thus, recovery will take place while program #4 is in effect.

When recovery is initiated and the heating system attempts to raise the ambient temperature, a user can become confused and concerned about heating system operation in apparent contradiction to the current thermostat program. This is especially true in recovery systems which generate a recovery period based on the current outside temperature and the current temperature in the region controlled by the thermostat. Since the recovery period generated according to such factors can vary from day to day, the user may wonder why the heating system does not operate or cycle consistently on a day-to-day basis.

The present invention seeks to overcome this problem by providing a number of mechanisms by which a programmable thermostat can readily and easily provide a user with an indication that the recovery operation is in progress. These various mechanisms will be explained below.

Figure 1:
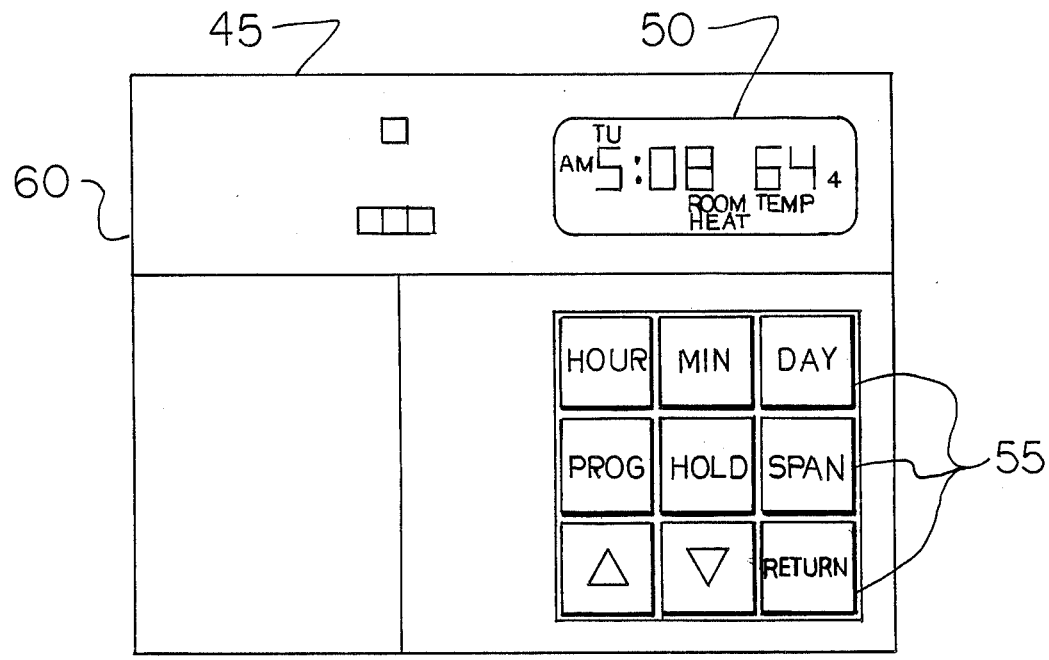
FIG. 1 illustrates a programmable thermostat in accordance with present invention.

FIG. 1 illustrates a programmable thermostat. Thermostat 45 has a display 50 which includes a digital clock with a liquid crystal display which displays the time of day in hours and minutes, an A.M. or P.M. indicator, day of the week, current room temperature, current program number, an indication whether the system is in heating, cooling, or automatic mode, and a low battery indicator (not shown).

Keys 55 include an HOUR, a MIN, and a DAY key for respectively entering the hour of the day, the minute of the day, and the day of the week. The PROG key is used for reviewing or entering the various program cycles. The HOLD key permits a user to override programmed temperature settings for an extended period of time by keying in a new temperature setting. The HOLD key also permits manual operation of the thermostat. The RETURN key returns display 50 to the current time and temperature. If pressed for more than three seconds, the RETURN key also returns thermostat 45 from a manual override mode. The temperature SPAN key may be used to set high and low temperature limits relative to the control temperature to better control the on and off cycling of the air conditioning system for improved control of the ambient temperature.

The thermostat may be programmed by use of the PROG key. After depressing the PROG key, the clock may be advanced to the desired program time by use of the hour and minute keys. The program temperature may be set by use of the arrow keys to raise and lower the temperature. Subsequent depressions of the PROG key permit additional programs to be entered into the thermostat.

The arrow keys may be used to override a programmed temperature setting. The override mode permits a user to instruct the thermostat to ignore program settings without requiring the thermostat to be reprogrammed. Using temporary manual override, the temperature setting may be raised or lowered to a temporary setting until the next programmed time. The temperature may be changed by use of the arrow keys and the thermostat will remain in manual override until the next programmed time. The thermostat may be permanently manually overridden for an extended period of time, such as a vacation, by following the above procedure and then depressing the HOLD key. To return back to the programmed temperature scheme from a permanent manual override mode, the RETURN key may be depressed for three seconds. Alternatively, the override mode may be activated for some predetermined time interval such as one hour, two hours, etc.

Figure 2:
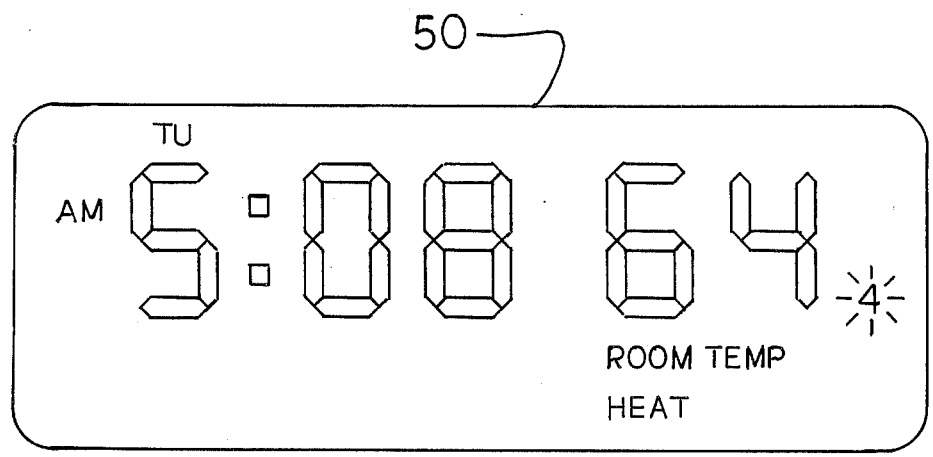
FIG. 2 is an enlarged view of the thermostat display of FIG. 1.

FIG. 2 illustrates in greater detail thermostat display 50. Utilizing the heating program of Table 1, at 5:08 a.m., the program indicator displays "4", as shown. The program number display will change in accordance with the schedule entered into the thermostat by the user.

According to the present invention, the current program number will begin to flash when the temperature recovery operation or cycle is initiated. This flashing will indicate that the current program temperature is not controlling the heating system operation and that temperature recovery is underway. Normally, when temperature recovery is not in progress, the current program number will remain steadily lit and will not flash. Thus, the flashing will provide a ready indication to the user that temperature recovery is in progress. Utilizing the above example, when recovery is initiated at some time prior to 6:00 a.m. to raise the ambient temperature to 68°, the program number 4 will begin to flash.

Alternatively, upon the initiation of the recovery cycle, the subsequent program number may be made to flash. This serves as an indication that although the program corresponding to the current time is in progress, the thermostat is attempting to control the heating system such that the control temperature corresponding to the subsequent program time will be obtained by the subsequent program time. Again utilizing the above example, when recovery is initiated at some time prior to 6:00 a.m. to raise the ambient temperature to 68°, in accordance with this embodiment, the program number "1", representing the subsequent program number, will begin to flash.

Figure 7:
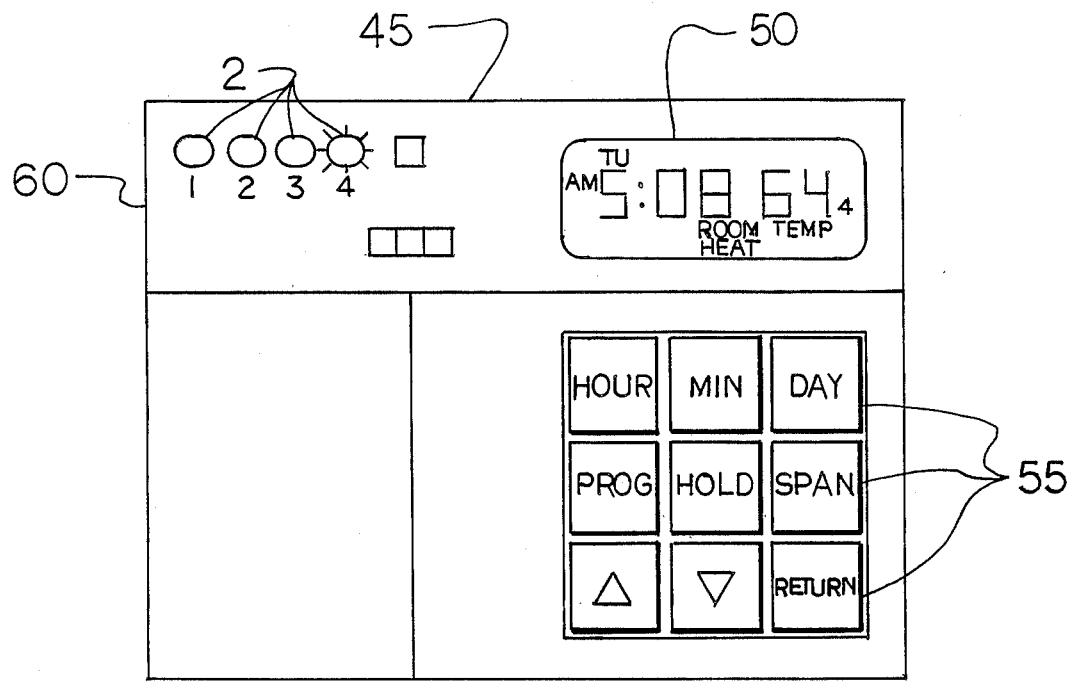
FIG. 7 illustrates a thermostat in accordance with another embodiment of the present invention.

In accordance with another embodiment of the present invention, an LED light display many be utilized as shown in FIG. 7. A control signal from the output controller (discussed below) selectively lights and flashes LEDs 2. The LEDs are separate from LCD 50. Again utilizing, the above example, when recovery is initiated at some time prior to 6:00 a.m. to raise the ambient temperature to 68°, the LED associated with program number 4 will light or flash. Alternatively, upon the initiation of the recovery cycle, the LED associated with the subsequent program number may be made to light or flash. In still another embodiment, a single LED may be provided which lights or flashes when recovery is initiated.

The present invention is not limited to thermostat displays providing the current program number. In an alternative embodiment, other indicia of program identification may be made to flash as an indicator that temperature recovery is in progress. Thus, if indicia such as MORN, NOON, EVE, or NIGHT are used to represent heating or cooling programs corresponding to those respective periods, these indicia may also be made to flash. Other indicators such as COMFORT to indicate the normal, occupied ambient temperature and SETBACK to indicate the setback temperature may also be utilized. The particular program indicia discussed here is intended to be illustrative only and the invention is not limited in this respect. It will be apparent to those of ordinary skill that other program indicia may be utilized within the scope of this invention.

Figure 3:
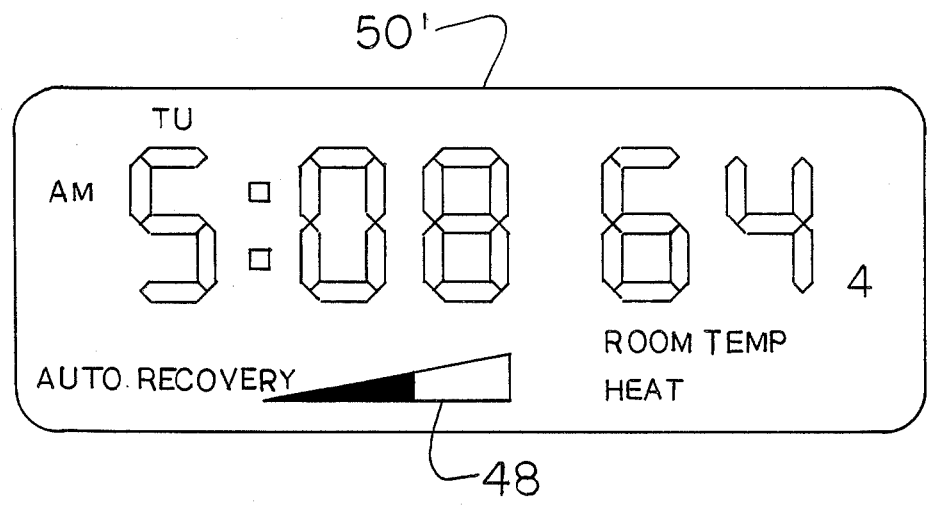
FIG. 3 illustrates a thermostat display in accordance with another embodiment of the present invention.
Figure 4:
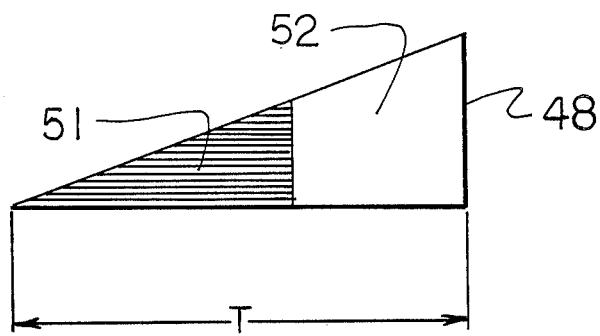
FIG. 4 illustrates in greater detail the graphic indicator of the thermostat display of FIG. 3.

In another alternative embodiment, illustrated in FIG. 3, the thermostat display may provide a graphical representation of the recovery operation. FIG. 3 illustrates a thermostat display 50' similar to that of FIG. 2 with the addition of temperature recovery graph 48. As shown in FIG. 4, the horizontal range of recovery graph 48, indicated by T, represents the total recovery period. Recovery graph 48 provides a quick visual indication of the extent to which recovery has progressed. Region 51 represents the extent to which recovery has been effected while region 52 represents the remainder of the recovery period. This embodiment not only indicates to the user that recovery has been initiated, but also provides a ready indication of the extent to which recovery has been effected and how much of recovery operation still must be performed. The horizontal axis of the graph may represent recovery as a function of elapsed time since initiation of recovery or temperature.

Figure 4A:
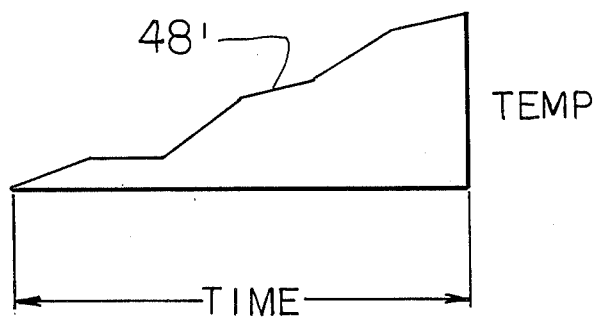
FIG. 4A illustrates another embodiment of a graphic indicator which may be utilized with the thermostat display of FIG. 3.

FIG. 4A illustrates recovery graph 48' which provides a visual indication of the recovery ramp. The recovery ramp illustrates how the temperature is recovering as a function of time.

Figure 5:
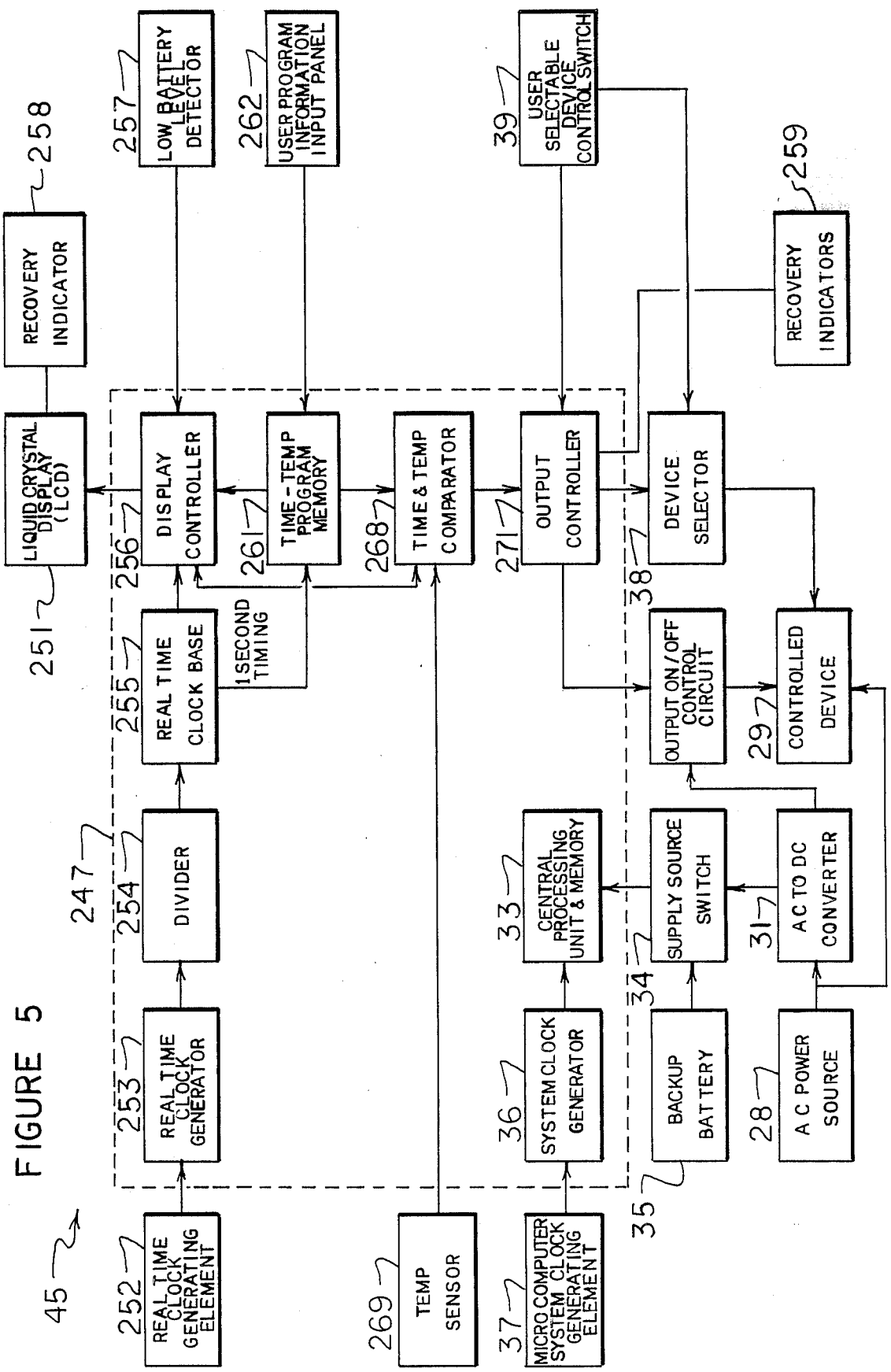
FIG. 5 is a hardware diagram of a thermostat which may embody the present invention.

A hardware diagram of a thermostat which may embody the present invention appears in FIG. 5. The thermostat includes a single chip microcomputer 247 having a read only memory (ROM) for software and a random access memory (RAM) for data storage. The component blocks bounded by the broken lines are contained within microcomputer 247. Thermostat 45 includes a real time clock generator 253 which generates a real time timing signal in the presence of real time clock generating element 252. The timing signal generated by clock generator 253 is divided repeatedly by divider 254 to generate a 1 second timing signal for real time clock base 255. The real time clock tracking of clock base 255 is necessary for the programming (software) features of the thermostat. Real time clock base 255 also provides a signal to display controller 256 which generates the time of day display for LCD 251. Low battery level detector 257 determines when new batteries are needed for the thermostat and provides a signal to display controller 256 to illuminate or flash a low battery prompt on LCD 251.

Recovery indicator 258 on LCD display 251 indicates when auto-recovery is in progress. Block 258 generally represents the flashing indicia and graphic displays described above. Block 259 represents auto-recovery indicators such as LEDs which are triggered by a signal from output controller 271.

Component block 262 is a program control data input which is preferably keys on programmable thermostat 245. The program data input to thermostat 245 via these keys is stored in memory 261. Each second, microcomputer 247 compares the program times stored in memory 261 and the real time to determine whether a new cooling or heating setpoint temperature is required. When the real time matches a program time, the program temperatures corresponding to that program time become the reference temperatures against which the ambient temperature sensed by temperature sensor 269 is compared by comparator 268 to determine the operating state of the heating/cooling system. Once the particular on/off criteria is reached, an on/off switching signal is sent to output controller 271 to switch the appropriate device via a series of device selecting circuits.

When microcomputer 247 determines that temperature recovery should be initiated, a signal is sent to display controller 256 to generate the visual display indicating that recovery is in progress.

Figure 6:
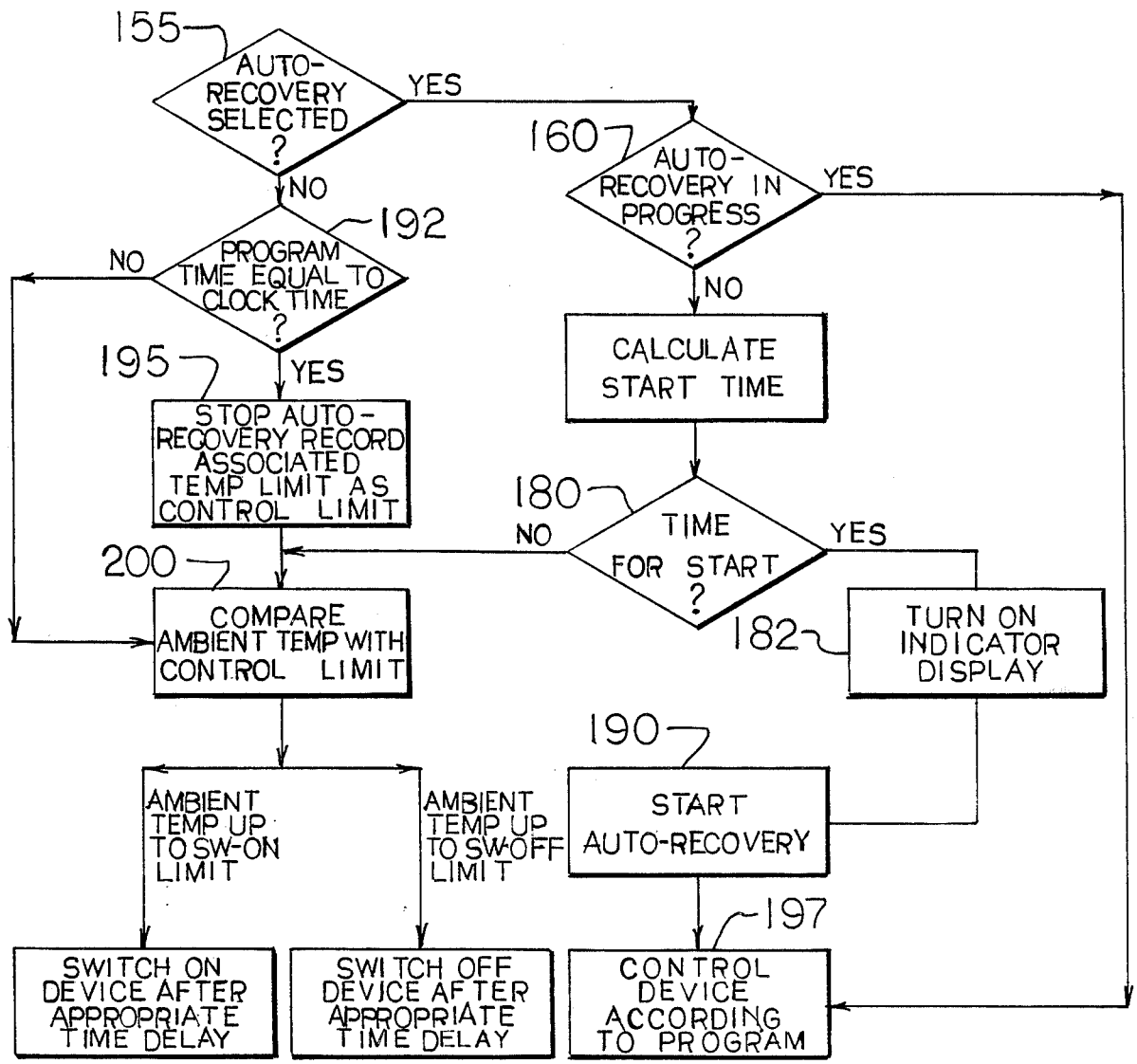
FIG. 6 is a flow chart illustrating the operation of the thermostat of FIG. 5.

The thermostat operation will be explained with reference to the flow chart of FIG. 6. A determination is made at step 155 as to whether the temperature (auto) recovery mode has been selected. If so, control passes to step 160 where a determination is made as to whether auto recovery is in progress. If not, the start time for recovery is calculated according to a predetermined formula and a determination is made at step 180 whether it is time for recovery to start. Various formulae are known in the art by which the recovery time may be calculated. The particular formula utilized is not critical to the present invention. If it is time for auto recovery to be initiated, control passes to step 182 where the signal is generated to switch on the appropriate auto recovery indicator. Once the indicator is on, control passes to step 190 where the actual auto recovery is activated and the air conditioning system is controlled according to the thermostat program at step 197. If, at step 180, it is not time auto recovery to start, control passes to step 200.

If the auto recovery mode has not been selected at step 155, a determination is made at step 192 whether the program time is equal to the real clock time. If not, control again passes to step 200. If so, control passes to step 195 and auto recovery is stopped and the program temperatures become the new control temperatures.

At step 200, the ambient temperature is compared with the control limit temperature. If the ambient temperature is such that the heating or cooling devices should be switched on, the appropriate device is switched on after a predetermined time delay. If the ambient temperature is such that the heating or cooling device should be switched off the appropriate device is switched off after a predetermined time delay.

If at step 160, auto-recovery is in progress, control passes to step 197 and again the heating or cooling device is controlled according to the thermostat recovery program. Various recovery programs are known in the art and the specific recovery program utilized is not critical to the present invention.

The invention has been described in detail in connection with the preferred embodiments. These embodiments, however, are merely for example only and the invention is not limited thereto. It will be easily understood by those skilled in the art that other variations and modifications can easily be made within the scope of this invention as defined by the appended claims.

I claim:

1. A programmable thermostat which controls an air conditioning system for a predetermined volume of space, said thermostat comprising:

sensor means for sensing the ambient temperature of the predetermined volume of space;

timing means for generating the current time of day;

a digital memory for storing a plurality of program times and at least one control temperature corresponding to each of the plurality of program times;

control means for controlling the on/off switching of said air conditioning system in response to (1) a comparison of the current time of day with the program times stored in said digital memory means to access the corresponding current control temperature stored in said digital memory means and (2) a comparison of the current ambient temperature sensed by said sensor means with the current control temperatures stored in said memory means;

a temperature recovery means for activating and controlling said air conditioning system prior to a given program time to bring the ambient temperature to the predetermined volume of space to a control temperature corresponding to the given program time by the given program time; and a display device including visual indicator means for visually indicating when said temperature recovery means has activated and is controlling said air conditioning system.

2. The programmable thermostat according to claim 1 wherein said visual indicator means generates flashing indicia related to the given program time.

3. The programmable thermostat according to claim 1 wherein said visual indicator means generates flashing indicia related to the program time prior to the given program time.

4. The programmable thermostat according to claim 1 wherein said visual indicator means includes graphic display means for graphically displaying the rate of the change of the ambient temperature of the predetermined volume of space.

5. The programmable thermostat according to claim 1 wherein said visual indicator means includes graphic display means for graphically displaying the extent to which the ambient temperature of the predetermined volume of space has been brought toward the control temperature corresponding to the given program time since the activation of said air conditioning system by said temperature recovery means.

6. The programmable thermostat according to claim 1 wherein said visual indicator means includes graphic display means for graphically displaying the time elapsed since the activation of said air conditioning system by said temperature recovery means.

7. The programmable thermostat according to claim 1 wherein said visual indicator means comprises an LED display.

8. A programmable thermostat which controls an air conditioning system for a predetermined volume of space, said thermostat comprising:
sensor means for sensing the ambient temperature within the predetermined volume of space;
a digital memory for storing a plurality of program times and a plurality of control temperatures corresponding to the program times;
control means for controlling the on/off switching of said air conditioning system in response to comparisons between the ambient temperature of the predetermined volume of space and the control temperatures stored in said digital memory;
temperature recovery means for activating and controlling said air conditioning system prior to a given program time so as to bring the ambient temperature of the predetermined volume of space to the control temperature corresponding to the given program time; and
a display device including graphic display means for graphically displaying information associated with the activation and control of said air conditioning system by said temperature recovery means.

9. A display device for a programmable thermostat which controls an air conditioning system for a predetermined volume of space, said display device comprising visual indicator means for visually indicating when a temperature recovery system has activated and is controlling said air conditioning system prior to a given program time to bring the ambient temperature of the predetermined volume of space to a predetermined temperature level by said given program time.

10. The display device according to claim 9 which further comprises graphic display means for graphically displaying the rate of the change of the ambient temperature of the predetermined volume of space.

11. The display device according to claim 9 which further comprises graphic display means for graphically displaying the extent to which the ambient temperature has been brought to the predetermined temperature since the activation of said air conditioning system by said temperature recovery system.

12. The display device according to claim 9 which further comprises graphic display means for graphically displaying the time elapsed since activation of said air conditioning system by the temperature recovery system.

13. The display device according to claim 9 wherein said visual indicator means comprises an LED display.

14. A display device for a programmable thermostat which controls an air conditioning system for a predetermined volume of space, said display device comprising visual indicator means for visually indicating when said programmable thermostat has activated and is controlling said air conditioning system so as to bring the ambient temperature of the predetermined volume of space to a predetermined temperature by a predetermined time, said visual indicator means including graphic display means for graphically displaying the rate of the change of the ambient temperature of the predetermined volume of space.

15. A display device for a programmable thermostat which controls an air conditioning system for a predetermined volume of space, said display device comprising visual indicator means for visually indicating when said programmable thermostat has activated and is controlling said air conditioning system so as to bring the ambient temperature of the predetermined volume of space to a predetermined temperature by a predetermined time, said visual indicator means including graphic display means for graphically displaying the extent to which the ambient temperature has been brought to the predetermined temperature since the activation of said air conditioning system by said programmable thermostat.

* * * * *